US010495343B2

(12) United States Patent
Jacques et al.

(10) Patent No.: US 10,495,343 B2
(45) Date of Patent: Dec. 3, 2019

(54) HIGH EFFICIENCY BOILER

(71) Applicant: Laars Heating Systems Company, Rochester, NH (US)

(72) Inventors: Christopher Jacques, West Newbury, MA (US); William R. Root, Rochester, NH (US)

(73) Assignee: Laars Heating Systems Company, Rochester, NH (US)

( * ) Notice: Subject to any disclaimer, the term of this patent is extended or adjusted under 35 U.S.C. 154(b) by 150 days.

(21) Appl. No.: 14/762,946

(22) PCT Filed: Jan. 23, 2014

(86) PCT No.: PCT/US2014/012704
§ 371 (c)(1),
(2) Date: Jul. 23, 2015

(87) PCT Pub. No.: WO2014/116804
PCT Pub. Date: Jul. 31, 2014

(65) Prior Publication Data
US 2015/0362211 A1      Dec. 17, 2015

Related U.S. Application Data

(60) Provisional application No. 61/756,805, filed on Jan. 25, 2013.

(51) Int. Cl.
*F24H 1/16* (2006.01)
*F24H 1/43* (2006.01)
*B23P 15/26* (2006.01)

(52) U.S. Cl.
CPC ............. *F24H 1/165* (2013.01); *B23P 15/26* (2013.01); *F24H 1/43* (2013.01); *Y10T 29/49389* (2015.01)

(58) Field of Classification Search
CPC . F24H 1/43; F24H 1/165; B23P 15/26; Y10T 29/49389
(Continued)

(56) References Cited

U.S. PATENT DOCUMENTS 4,401,058 A * 8/1983 Charrier ................. F24H 1/403
                                                          122/18.4
4,403,572 A * 9/1983 Gerstmann ........... F24D 11/002
                                                          122/20 B (Continued)

OTHER PUBLICATIONS

International Preliminary Report on Patentability for Application No. PCT/US2014/012704 dated Aug. 6, 2015.
(Continued)

*Primary Examiner* — Steven B McAllister
*Assistant Examiner* — Benjamin W Johnson
(74) *Attorney, Agent, or Firm* — RatnerPrestia

(57) ABSTRACT

A high efficiency compact boiler is disclosed which includes a burner configured to introduce combustion gases into an interior region of the boiler, a heat exchange tube made of a length of finned tubing in the form of a helical coil positioned within the interior region of the boiler such that combustion gases from the burner can flow from a region inside the helical coil to a region outside the helical coil, and a floating baffle configured to redirect the flow of combustion gases around the finned tubing as it passes from the region inside the helical coil to the region outside the helical coil, the baffle being positioned proximal adjacent turns of the helical coil and having a coiled configuration corresponding substantially to the helical coil.

19 Claims, 5 Drawing Sheets

(58) Field of Classification Search
USPC .......... 122/18.1, 18.4, 18.3, 18.31; 165/156, 165/183, 184, 171; 285/124.2
See application file for complete search history.

(56) References Cited

U.S. PATENT DOCUMENTS

| | | | | |
|---|---|---|---|---|
| 4,901,677 | A | * | 2/1990 | Demetri .................. F22B 21/26 122/235.17 |
| 5,311,843 | A | * | 5/1994 | Stuart ....................... F24H 1/43 122/18.4 |
| 5,687,678 | A | * | 11/1997 | Suchomel ................. F24H 1/43 122/247 |
| 6,109,339 | A | * | 8/2000 | Talbert ................ F24D 11/0214 165/48.1 |
| 6,315,332 | B1 | | 11/2001 | Aschoff et al. |
| 2007/0221143 | A1 | | 9/2007 | Hamada et al. |
| 2010/0170665 | A1 | | 7/2010 | Lovato |
| 2011/0041781 | A1 | * | 2/2011 | Deivasigamani ....... F24H 1/186 122/18.1 |

OTHER PUBLICATIONS

International Search Report for PCT/US2014/012704 mailed by the Blaine R. Copenheaver dated May 16, 2014.

\* cited by examiner

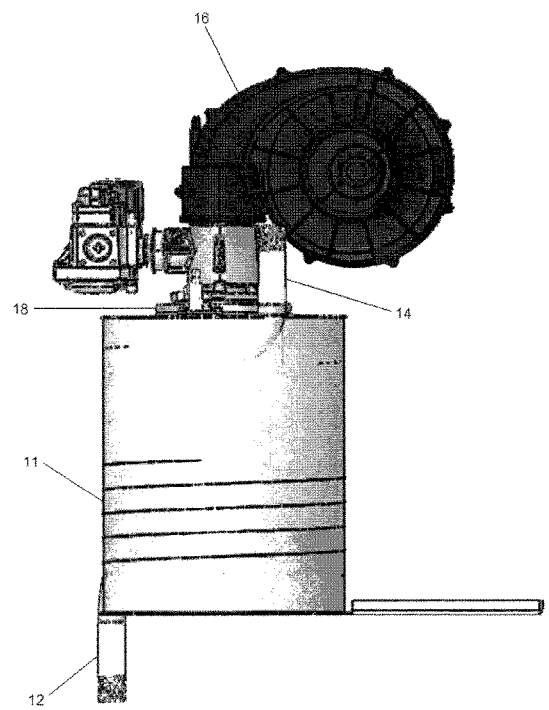
Figure 2a
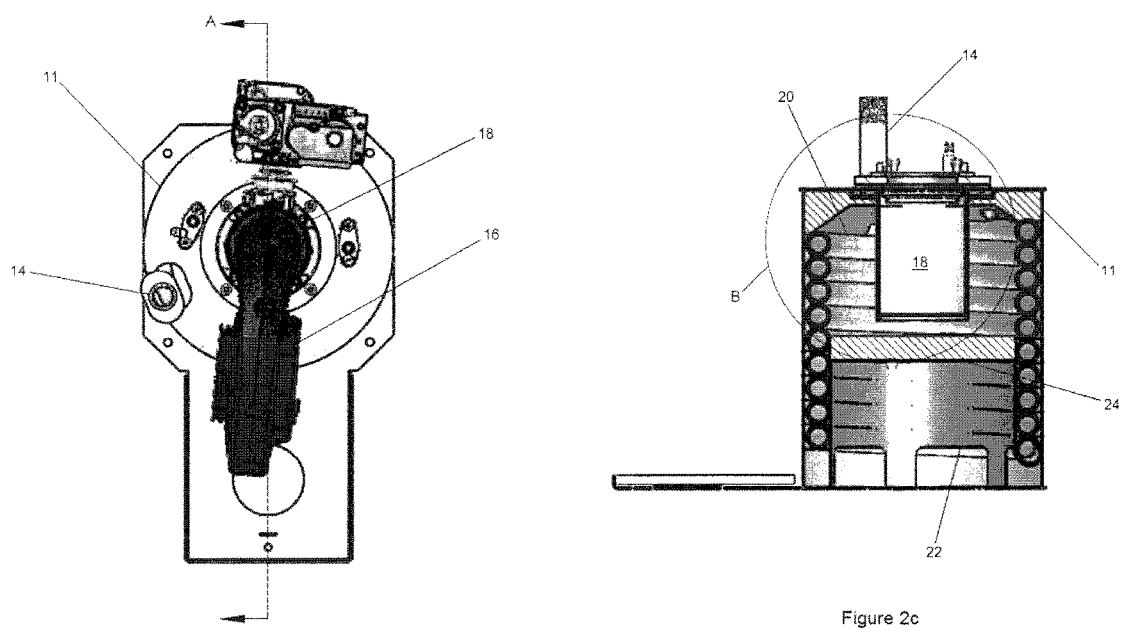
Figure 2b
Figure 2c

HIGH EFFICIENCY BOILER

CROSS-REFERENCE TO RELATED APPLICATION

This application is a U.S. National Phase Application of PCT International Application PCT/US2014/012704, filed Jan. 23, 2014, which this application is related to and claims the benefit of U.S. Provisional Application No. 61/756,805 entitled "HIGH EFFICIENCY BOILER" filed on Jan. 25, 2013, the contents of which are incorporated herein by reference.

FIELD OF THE INVENTION

This invention relates to fluid heaters. More particularly, it relates to compact high-efficiency tankless water boilers.

BACKGROUND

Some models of water heaters for residential and commercial use often include a large storage tank of water. To improve upon the efficiency of these boiler system designs, newer models are focused on maximizing the transfer of heat to smaller volumes of water that may be made available on demand.

To minimize the volume of water which is heated at any given time, water is heated as it passes through the continuous flow system. Because the retention time of the water within the boiler may be relatively short, it is imperative to design a system which can bring the water up to the target temperature within this short time frame. In addition with the increasing cost of fuel, there is a need to design systems which can maximize the transfer of heat from the products of combustion of fuel burners to the water flowing through the boiler and minimize the potential for heat loss.

SUMMARY OF THE INVENTION

In accordance to one embodiment of the present invention, there is provided a boiler comprising a burner oriented to extend into an interior region of the boiler and configured to introduce combustion gases into the interior region. The boiler also comprises a heat exchange tube extending into the interior region, which is made of a length of finned tubing and formed to include a helical coil positioned within the interior region of the boiler such that combustion gases from the burner can flow from a region inside the helical coil to a region outside the helical coil. The boiler also comprises a baffle configured to redirect the flow of combustion gases as it passes from the region inside the helical coil to the region outside the helical coil, the baffle being positioned proximal adjacent turns of the helical coil and having a coiled configuration corresponding substantially to the helical coil.

In accordance with another embodiment of the present invention, there is provided a method of efficiently heating fluid in a boiler. The method comprises flowing fluid through a helical coil made of a length of finned tubing within a housing, combusting a fuel with a burner to form a heated gas, and blowing the heated gas such that the heated gas travels through a first end of the helical coil, in between adjacent turns of the helical coil, around a baffle having a configuration corresponding substantially to the helical coil and positioned proximal the adjacent turns of the helical coil, along an annular space formed between the helical coil and the housing, and through a vent in a side of the housing.

In accordance with yet another embodiment of the present invention, there is provided a method of making a boiler. The method of making the boiler comprises positioning a length of finned tubing in the form of a helical coil to extend within an interior region of a housing, positioning a baffle proximal to adjacent turns of the helical coil, the baffle having a configuration corresponding substantially to the helical coil, and inserting a burner to extend within the housing and into a region inside the helical coil of finned tubing.

BRIEF DESCRIPTION OF DRAWINGS

Other aspects and advantages of the invention will be apparent from the following detailed description wherein reference is made to the accompanying drawings. In order that the invention may be more fully understood, the following figures are provided by way of illustration, in which:

FIG. 2a is a side view of the boiler in FIG. 1;

FIG. 2b is a top view of the boiler in FIG. 1;

FIG. 2c is a cross-sectional view of the boiler along axis A-A in FIG. 2b with the blower removed;

FIG. 3b is a magnified view of the section identified within circle C in FIG. 3a;

FIG. 4b is a top view of the baffle of FIG. 4a;

DETAILED DESCRIPTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
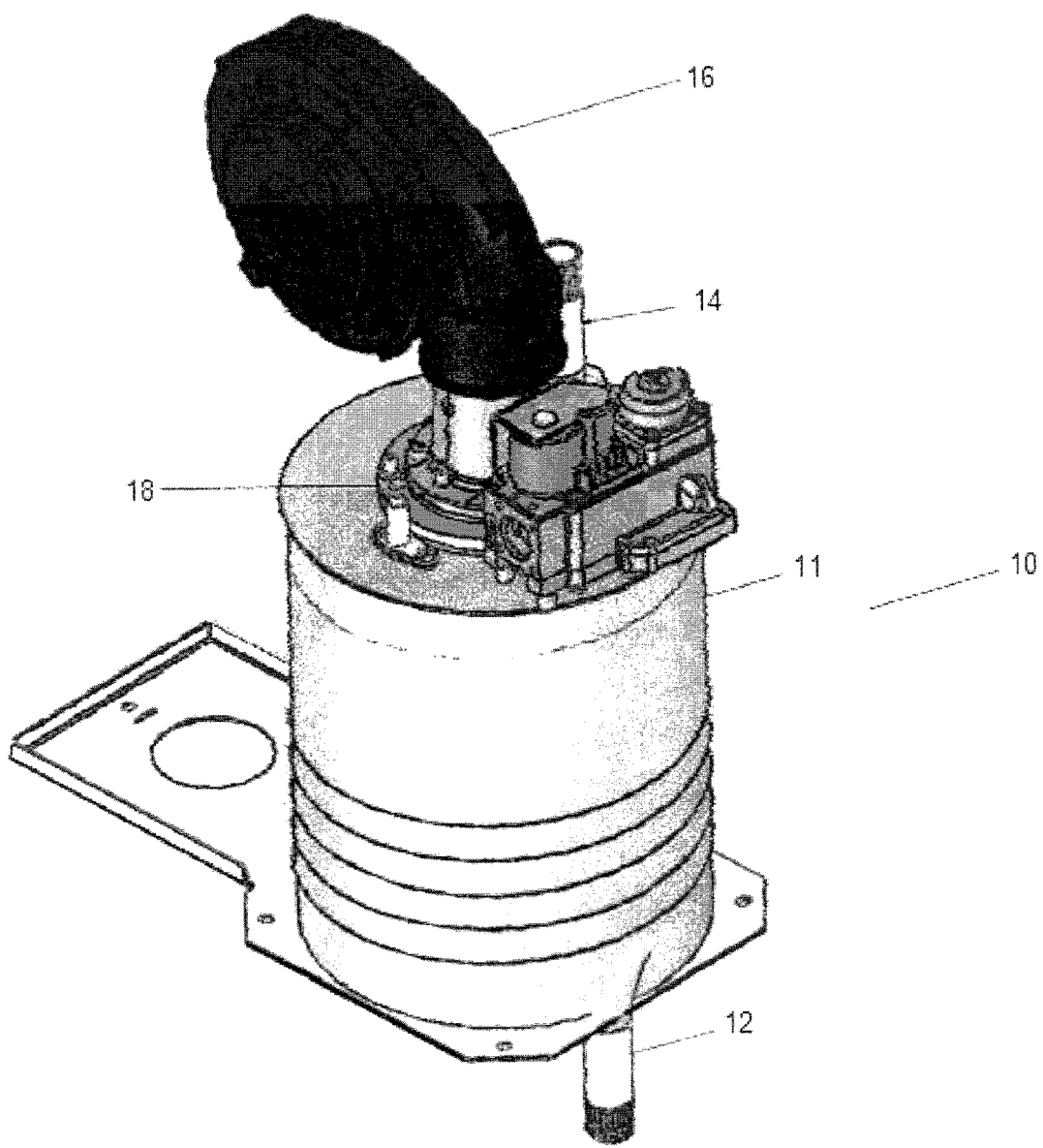
FIG. 1 is a top perspective view of a boiler according to one embodiment of the present invention.

Referring to the drawings, in which like numerals refer to like and corresponding parts of the various drawings, an embodiment of the present invention is illustrated in FIG. 1. A boiler 10 comprises a burner 18 oriented to extend into an interior region of the boiler 10 and configured to introduce combustion gases into the interior region. In the embodiment illustrated in FIG. 1, the burner is installed generally through the top center of the boiler. The burner may use any fuel having an adequate heat of combustion to sufficiently heat the water flowing through the boiler, the fuel is preferably natural gas. Attached to the burner 18 is a blower 16, which is preferably a variable blower so that the flow rate of combustion gases and resulting internal pressure of the boiler housing 11 may be controlled with an external programmable logic controller (not shown). The boiler 10 includes a water inlet 12 and water outlet 14; therefore, the blower 16 is configured to blow combustion gases in an opposing direction relative to a fluid flowing through the boiler 10.

A cross-section of the boiler 10 is illustrated in FIG. 2c. The water inlet 12 and outlet 14 form part of a heat exchange tube extending into the interior region of the housing 11. In the embodiment illustrated in FIG. 2c, the heat exchange tube is in the form of a helical coil 20 positioned within the interior region of the boiler housing 11 such that combustion gases from the burner 18 can flow from a region inside the helical coil 20 to a region outside the helical coil 20. By shaping the heat exchange tube into one long continuous coil, the present invention has an advantage over many modern vertical boilers. Typically in vertically oriented boilers, the tubing is arranged in several vertical sections running parallel to each other which requires the use of headers at the top, bottom, and, sometimes, middle of the boiler to distribute the fluid.

Boilers according to the present invention preferably include a continuous coiled tube to eliminate the need for headers. This contributes to simpler design requiring less welding. The use of a single continuous heat exchange tube also results in an overall compact design. The number of turns in the coil and the pitch of each turn may be varied depending on the desired retention time of the fluid flowing through the heat exchange tube, the desired rate of heat transfer, and the height and width of the boiler.

The heat exchange tube of the present invention is preferably made of a long finned tube, preferably a high density finned tube. It is preferable that the tubing is manufactured, for example, by extrusion, such that the fins are formed integral to the walls of the tubing, rather than applying separate fins or a jacket of fins to the surface of a cylindrical tube. A tube that is manufactured to have integral fins provides several advantages, such as optimal heat transfer ability, reduced manufacturing steps resulting in lowered costs, and elimination of the risk that the fins will detach from the heat exchange tube. The use of a finned tube increases the external surface area of the heat exchange tube contributing to higher heat transfer between the combustion gases flowing through the boiler housing and the water flowing through the heat exchange tube. The finned tube preferably has a 16-36 fins per inch (FPI), more preferably 20-32 FPI, and most preferably 26 FPI. It is also preferred that the fins have a height from 0.001" to 0.125", more preferably a height from 0.025" to 0.075", and most preferably 0.040" to 0.060".

The heat exchange tube may be made of any suitable material with an adequate conductivity for heat transfer, resistance to corrosion, and resiliency to withstand the expansion and contraction as a result of the changes in temperature. The heat exchange tube is preferably made of stainless steel.

Figure 3A:
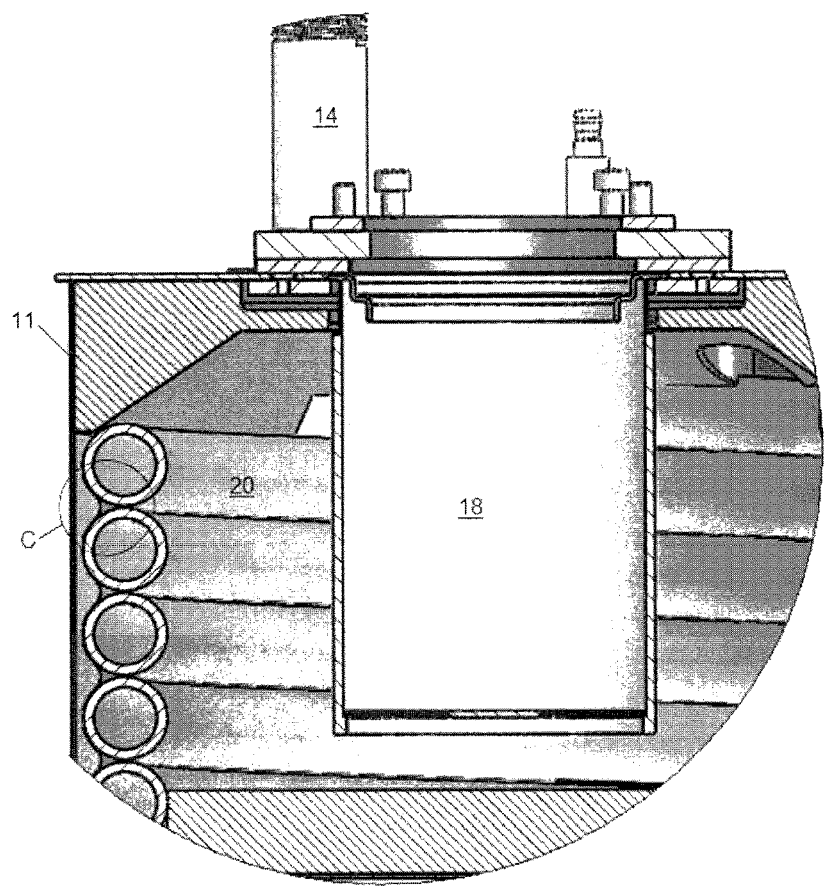
FIG. 3a is a magnified view of the section identified within circle B in FIG. 2c.
Figure 3B:
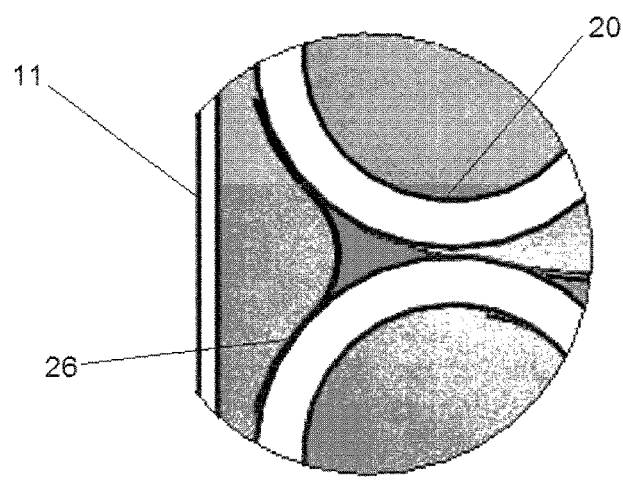
Figure 4C:
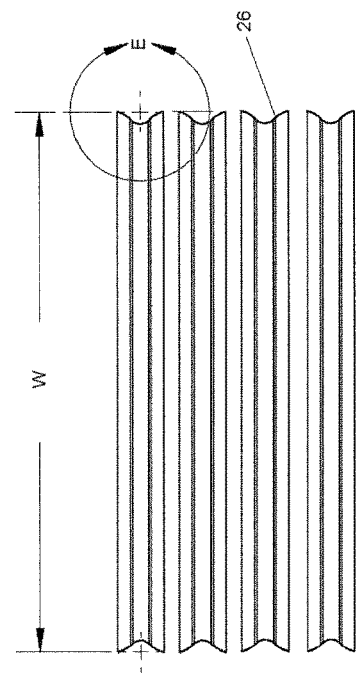
FIG. 4c is a cross-sectional view of the baffle along axis D-D in FIG. 4b.
Figure 4B:
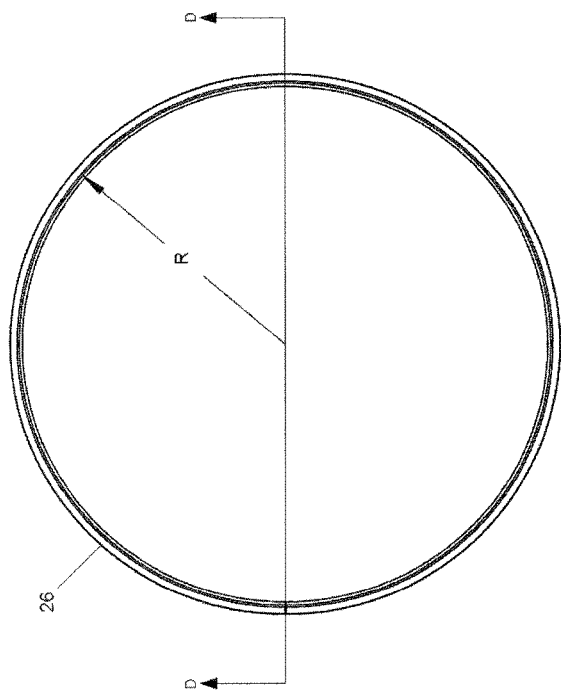
Figure 4D:
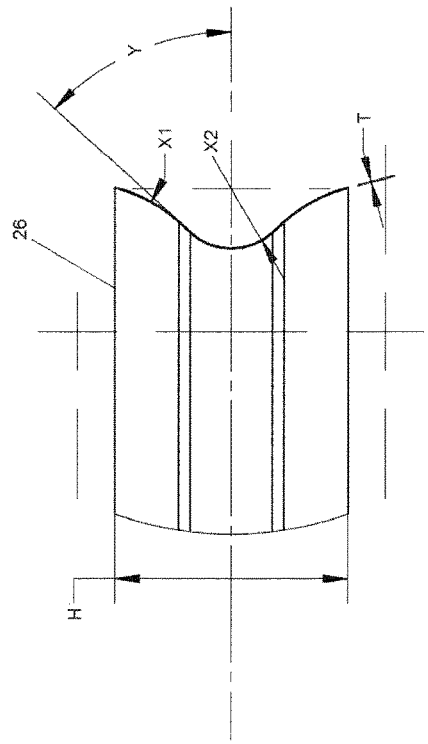
FIG. 4d is a magnified view of an end of one of the turns of the baffle within circle E of FIG. 4c.
Figure 4A:
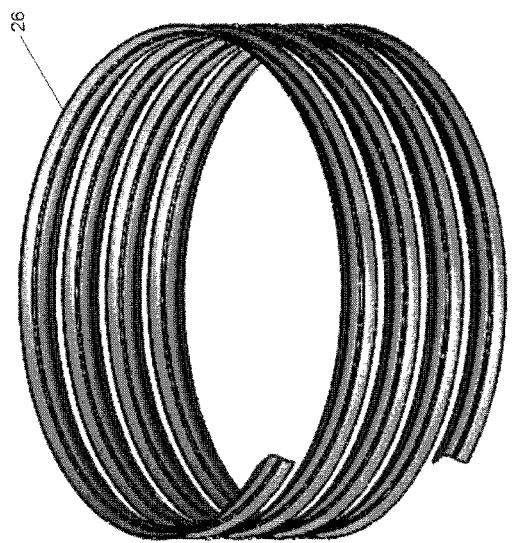
FIG. 4a is a top perspective view of the coiled baffle illustrated in FIGS. 3a and 3b.

The boiler 10 also comprises a baffle 26 wrapped around at least a portion of the helical coil 20 as illustrated in FIGS. 3a and 3b. The baffle 26 is configured to redirect the flow of combustion gases as it passes from the region inside the helical coil 20 to the region outside the helical coil 20. The baffle 26 of the embodiment of the present invention illustrated in FIGS. 3a and 3b is able to promote the transfer of heat from the combustion gases to the heat exchange tube by being positioned proximal adjacent turns of the helical coil 20 and having a configuration corresponding substantially to the helical coil 20. It is preferred that the baffle has a configuration in which the radii of curvature is similar to the radii of curvature of a corresponding surface of the heat exchange coil. It is most preferred that the contour of the baffles is substantially parallel with the contour of a corresponding surface of the heat exchange coil. It is believed that the combination of a baffle having a configuration corresponding substantially to the helical coil and a helical coil made of heat exchange tube having relatively short integral fins contributes to the advantageous compact design and high efficiency of the present invention.

The purpose of the baffle positioned around the outside of the helical coil is to promote contact between the combustion gases and the external surface of the helical coil. The purpose is also to slow the flow of gases, thereby increasing contact time and the rate of heat transfer. Therefore, it is preferred that the baffle contacts fins of the finned tube and that the baffle is a length of material in the form of a coil and configured to channel gases around the finned tubing. It is preferred that the baffle 26 is also helical in shape and that each turn of the baffle has a cross-section which is "V" or gullwing shaped.

An embodiment of the baffle applied to the exterior of the helical coil is illustrated in FIGS. 4a-4d. The baffle 26 has an internal diameter W which corresponds closely to the external diameter of the portion of the helical coil to which the baffle is applied. Various dimensions of the baffle 26 are selected to achieve adequate channeling of the combustion gases around the finned tubing, such as the height H of each turn of the helical baffle and the contour of the arcuate sections X1 and X2 and point of deflection between the arcuate sections located at an angle Y of the gullwing shape illustrated in FIG. 4d.

As noted above, the purpose of the helical baffle is to impede the flow of the hot gases to increase the contact time with the finned coiled tube. The baffle is designed such that it can be rolled or "screwed" onto the coiled tube and remains in place by a friction fit, such that the baffle is floating in that it is not required to be fixed to the coiled tube. Because fasteners need not be used, portions of the baffle coil are allowed to expand or otherwise move slightly in response to the force of the blown air and changes in temperature. The amount of expansion is controlled by the dimensions of the helical configuration mentioned above, as well as the thickness T of the material illustrated in FIG. 4d.

The resistance provided by the baffle is precisely selected. If the baffle is too tight, a large blower may be needed to force the hot air through the system. This increases costs and reduces the overall compact design. A loose baffle would, however, allow the air to flow through quickly, thus reducing the efficiency of heat transfer. Over time, particulate matter from the combustion gases may accumulate on the finned tubing which also contributes to the resistance to flow of the combustion gases. The baffle design again provides the advantage of offsetting the resistance created by the particulate matter by expanding slightly with respect to the coiled tubing and providing alternate paths for gas flow. The lack of fasteners also provides for easy removal of the baffle for cleaning of the finned tubing.

Referring to FIG. 2c, the boiler made according to the present invention preferably comprises a second baffle 22 oriented to extend into the region inside the helical coil opposite the burner. The baffle 22 may have a cylindrical configuration with a substantially flat top surface that is adjacent outlet of the burner 18. The boiler may also optionally include one or more ring or C-shaped baffles along the height of the second baffle 22 and the lower portion of the inner wall of the housing 11, such that the ring or C-shaped baffles are in between adjacent turns of the helical coil. Preferably a refractory material 24 is placed between the outlet of the burner 18 and the second baffle 22 to provide a protective layer against the force of the hot combustion gases blown directly onto the top surface of the baffle 22. The interior cylindrical baffle 22 forces the combustion gases flowing through the bottom half of the boiler housing 11 towards the periphery around the annulus formed between the exterior of the helical coil 20 and the interior of the housing 11 before exiting the bottom of the housing through a vent hole.

Figure 5:
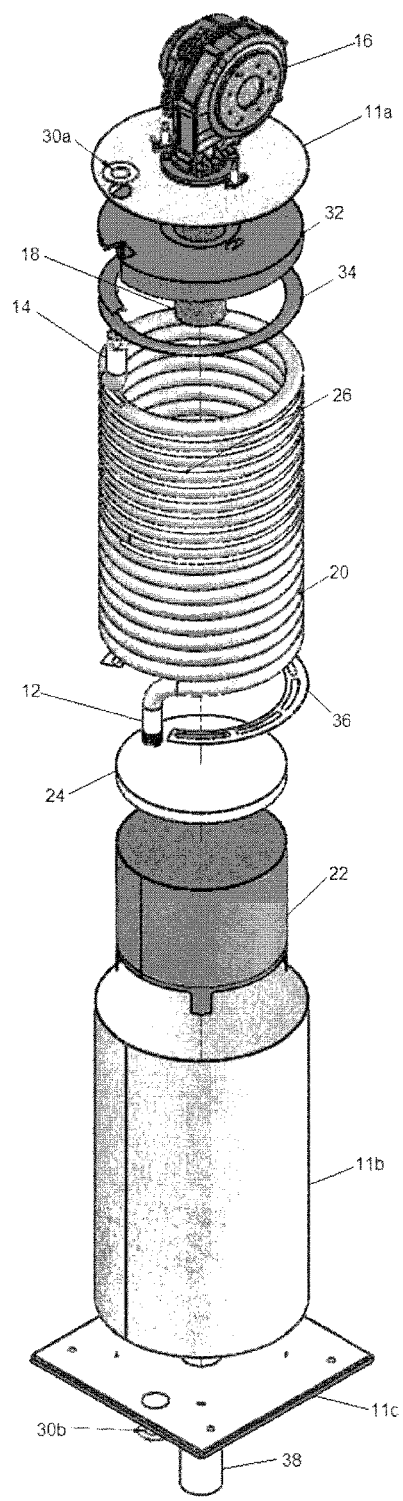
FIG. 5 is an exploded view of a boiler according to another embodiment of the present invention.

With reference to FIG. 5, a method of manufacturing a boiler within the scope of the invention comprises first affixing a cylindrical baffle 22 to the top surface of a base 11c of the boiler housing. A gas outlet may be generally located in the center of the base 11c and a vent pipe 38 may extend from the bottom surface of the base 11c in line with the gas outlet. The base 11c may also include a tube outlet. A ring-shaped baffle 36 may optionally be positioned around the circumference just below the top surface of the cylindrical baffle 22. Refractory material 24 in the form of a circular tile may be placed on the top surface of the cylindrical baffle 22. A heat exchange tube is positioned over the cylindrical baffle 22 and the refractory material 24, and the inlet of the heat exchange tube is inserted through the tube outlet in the base 11c. The heat exchange tube may be affixed to the base 11c, preferably by welding with a weld ring 30b.

The heat exchange tube preferably includes a length of finned tubing in the form of a helical coil 20. Once in position, a coiled baffle 26 having a configuration corresponding substantially to the helical coil 20 is positioned proximal to adjacent turns of the helical coil 20 which may be accomplished by merely screwing the coiled baffle 26 onto the helical coil 20. The helical coil 20 should also be positioned to extend within an interior region of the boiler housing. Therefore, a cylindrical portion 11b of the housing is positioned over the helical coil 20.

A ring of insulation 34 may be placed on the top of the helical coil 20 prior to also placing a top tile 32 having an inner bore through which a burner 18 is inserted to extend within the housing and into a region inside the helical coil 20 of finned tubing. A top cover 11a of the housing which also includes an inner bore through which a portion of the burner 18 is inserted includes a tube outlet. The end of the heat exchange tube is inserted through the tube outlet in the top cover 11a prior to welding the top cover 11a to the top of the cylindrical portion of the housing 11b. The end of the heat exchange tube may also be welded to the top cover 11a with another weld ring 30a. Finally, the blower 16 may be attached to the burner 18.

Yet another embodiment of the present invention includes a method of efficiently heating fluid in a boiler comprising flowing fluid through a helical coil made of a length of finned tubing within a housing, combusting a fuel with a burner to form a heated gas, and blowing the heated gas through the boiler. The path through the boiler is such that the heated gas travels through a first end of the helical coil, in between adjacent turns of the helical coil, around a baffle being positioned proximal the adjacent turns of the helical coil, along an annular space formed between the helical coil and the housing, and through a vent in a side of the housing. The baffle has a configuration corresponding substantially to the helical coil.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

The invention claimed is:

1. A boiler comprising:
a burner oriented to extend into an interior region of the boiler and configured to introduce combustion gases into the interior region;
a base having a flue gas outlet;
a cylindrical baffle positioned over the flue gas outlet, the cylindrical baffle having a cylindrical configuration with a top surface that is substantially flat;
a refractory material in a form of a circular tile adjacent the top surface of the cylindrical baffle;
a heat exchange tube extending into the interior region, the heat exchange tube being made of a length of finned tubing and being formed to include a continuous helical coil having at least a first turn and a second turn and positioned within the interior region of the boiler such that combustion gases from the burner can flow from a region inside the helical coil to a region outside the helical coil; and
a continuous baffle configured to redirect the flow of combustion gases as it passes from the region inside the helical coil to the region outside the helical coil, the continuous baffle being positioned in contact with adjacent turns of the helical coil and having a helical configuration including at least a first turn and a second turn, the first and second turns of the continuous baffle having a space therebetween, the continuous baffle having a cross-section that is gullwing shaped, such that a first section of the gullwing shape has a curvature that corresponds to a curvature of an outer surface of the first turn of the heat exchange tube and a second section of the gullwing shape has a curvature that corresponds to a curvature of an outer surface of the second turn of the heat exchange tube, the first section of the gullwing shape contacting the fins of the first turn of the heat exchange tube and the second section of the gullwing shape contacting the fins of the second turn of the heat exchange tube, wherein the contact between the continuous baffle and the helical coil is maintained through a friction fit and in the absence of any fastener.

2. The boiler of claim 1, wherein the length of finned tubing has a fin density of 20 to 36 fins per inch.

3. The boiler of claim 1 further comprising a blower attached to the burner, wherein the blower is configured to blow combustion gases in an opposing direction relative to a fluid flowing through the boiler.

4. The boiler of claim 1 wherein the burner is vertically oriented.

5. The boiler of claim 1 wherein the baffle is a length of material in the form of a coil and configured to channel gases around the finned tubing.

6. The boiler of claim 1 wherein the baffle is configured such that at least a portion of the baffle moves in response to blown combustion gases.

7. The boiler of claim 1, wherein the curvature of the first section has a radius corresponding to a radius of the curvature of the surface of the first turn of the heat exchange tube and the curvature of the second section has a radius corresponding to a radius of the curvature of the surface of the second turn of the heat exchange tube.

8. The boiler of claim 1, further comprising a ring shaped baffle positioned around a circumference of the cylindrical baffle below the top surface of the cylindrical baffle.

9. The boiler of claim 1, wherein the helical coil has an inner diameter, and the cylindrical baffle and the refractory material each have an outer diameter less than the inner diameter of the helical coil, such that the cylindrical baffle and the refractory material are positioned radially inwardly relative to the helical coil.

10. A method of efficiently heating fluid in the boiler of claim 1, the method comprising the steps of:
flowing fluid through the heat exchange tube;
combusting a fuel with the burner to form a heated gas; and
blowing the heated gas such that the heated gas travels in between adjacent turns of the heat exchange tube, around the continuous baffle positioned in contact with the adjacent turns of the heat exchange tube, along an annular space formed between the heat exchange tube and a housing of the boiler, and through a vent in a side of the housing.

11. The method of claim 10 further comprising blowing the heated gas in between at least a portion of the fins of the finned tubing, wherein the length of finned tubing has a fin density of 20 to 36 fins per inch.

12. The method of claim 11 further comprising blowing the heated gas by a blower attached to the burner.

13. The method of claim 12 further comprising blowing the heated gas in an opposing direction relative to the fluid flowing through the boiler.

14. The method of claim 10 further comprising blowing the heated gas against the baffle to channel the heated gas around the finned tubing.

15. The method of claim 10 further comprising blowing the heated gas against the baffle, the baffle being configured such that at least a portion of the baffle moves in response to the blown heated gases.

16. A method of making a boiler comprising:
positioning a cylindrical baffle over a flue gas outlet, the cylindrical baffle having a cylindrical configuration with a top surface that is substantially flat;
positioning a refractory material in a form of a circular tile on the top surface of the cylindrical baffle;
positioning a length of finned tubing in the form of a helical coil to extend within an interior region of a housing, the helical coil having at least a first turn and a second turn;
positioning a continuous baffle in contact with adjacent turns of the helical coil by screwing the continuous baffle around the helical coil, the continuous baffle having a configuration including at least a first turn and a second turn, the first and second turns of the continuous baffle having a space therebetween, and having a cross-section that is gullwing shaped, such that a first section of the gullwing shape has a curvature that corresponds to a curvature of an outer surface of the first turn of the helical coil and a second section of the gullwing shape has a curvature that corresponds to a curvature of an outer surface of the second turn of the helical coil, and the first section of the gullwing shape contacts the fins of the first turn of the helical coil and the second section of the gullwing shape contacts the fins of the second turn of the helical coil, wherein the contact between the continuous baffle and the helical coil is maintained through a friction fit and in the absence of any fastener; and
inserting a burner to extend within the housing and into a region inside the helical coil of finned tubing.

17. The method of claim 16 further comprising manufacturing the continuous baffle by forming a length of material into a coil configured to channel gases around the finned tubing.

18. The method of claim 16, further comprising positioning a ring shaped baffle around a circumference of the cylindrical baffle below the top surface of the cylindrical baffle.

19. The method of claim 16, further comprising positioning a first ring of insulation on top of the length of finned tubing in the form of the helical coil and positioning a top tile having an inner pore for receiving a burner proximal to the first ring of insulation.

* * * * *